United States Patent [19]

Sircar

[11] Patent Number: 5,071,449
[45] Date of Patent: Dec. 10, 1991

[54] GAS SEPERATION BY RAPID PRESSURE SWING ADSORPTION

[75] Inventor: Shivaji Sircar, Wescosville, Pa.

[73] Assignee: Air Products and Chemicals, Inc., Allentown, Pa.

[21] Appl. No.: 615,075

[22] Filed: Nov. 19, 1990

[51] Int. Cl.⁵ .............................................. B01D 53/04
[52] U.S. Cl. ......................................... 55/26; 55/33; 55/58; 55/62; 55/68; 55/74; 55/75; 55/179; 55/387; 55/389
[58] Field of Search ................... 55/25, 26, 58, 62, 68, 55/74, 75, 161-163, 179, 387, 389

[56] References Cited

U.S. PATENT DOCUMENTS

| | | | |
|---|---|---|---|
| 3,242,645 | 3/1966 | de Montgareuil et al. | 55/68 X |
| 3,430,418 | 3/1969 | Wagner | 55/25 |
| 4,062,777 | 12/1977 | Tsuruta et al. | 55/179 X |
| 4,194,891 | 3/1980 | Earls et al. | 55/26 |
| 4,194,892 | 3/1980 | Jones et al. | 55/58 |
| 4,354,859 | 10/1982 | Keller, II et al. | 55/68 X |
| 4,386,945 | 6/1983 | Garnder | 55/26 |
| 4,406,675 | 9/1983 | Dangieri et al. | 55/58 X |
| 4,421,530 | 12/1983 | Dalton, Jr. et al. | 55/26 |
| 4,421,531 | 12/1983 | Dalton, Jr. et al. | 55/26 |
| 4,436,534 | 3/1984 | Seguy | 55/58 |
| 4,448,592 | 5/1984 | Linde | 55/68 |
| 4,516,985 | 5/1985 | Winter | 55/25 X |
| 4,744,803 | 5/1988 | Knaebel | 55/25 |
| 4,848,985 | 7/1989 | Sadkowski | 55/26 |
| 4,853,004 | 8/1989 | Kaplan et al. | 55/25 |
| 4,948,391 | 8/1990 | Noguchi | 55/26 |

FOREIGN PATENT DOCUMENTS

1153316  9/1983  Canada .................... 55/25

Primary Examiner—Robert Spitzer
Attorney, Agent, or Firm—Geoffrey L. Chase; James C. Simmons; William F. Marsh

[57] ABSTRACT

A rapid adiabatic pressure swing adsorption process with a total cycle time ranging from 6 to 60 seconds with feed being introduced into a single separation vessel having dual adsorption layers operated alternately by a pressurized continuous feed gas involving a continuous feed and two continuous product streams, one being enriched in the less strongly adsorbed component of the feed mixture.

22 Claims, 3 Drawing Sheets

GAS SEPERATION BY RAPID PRESSURE SWING ADSORPTION

TECHNICAL FIELD

The present invention relates to a process and apparatus for separating the components of a multi-component gas stream employing rapid pressure swing adsorption (RPSA). One specific embodiment involves the use of a single separation vessel having multiple adsorption layers which are operated alternately by a pressurized continuous feed gas stream.

BACKGROUND OF THE INVENTION

Pressure swing adsorption (PSA) processes are well-known for separating gas mixtures by selective adsorption of one or more components of the gas mixture on an adsorbent. By way of example, U.S. Pat. No. 3,430,418 discloses a PSA process employing four adsorbent columns arranged in parallel flow relationship, with each column proceeding sequentially through a multi-step cycle, consisting of adsorption, two concurrent depressurizations, countercurrent depressurization, countercurrent purge and two countercurrent pressurization steps. The purpose of such a complex process design is to improve the separation efficiency. The operation of the process requires at least four adsorbent columns interconnected by several gas headers and many switch valves in order to have a continuous feed stream and product stream. It is apparent that the total cycle time required for completion of the steps of this process, which include flowing large quantities of gas in and out of the adsorbent columns and transfer of gas between columns, will be significant. For example, one embodiment of U.S. Pat. No. 3,430,418 for production of oxygen from air by selective adsorption of nitrogen on a zeolite requires 240 seconds to complete one cycle.

Generally, PSA systems require multi-step cycles and multicolumn design using several gas headers and switch valves in order to obtain high degree of separation and continuity of feed and product gases. Consequently, they require total cycle times of one to several minutes. Typically, at least one adsorbent column in the system undergoes the adsorption step at all times during the cycle so that the time slot for the adsorption step is given by the ratio of the total cycle time for the multi-step process to the number of adsorbers used in the process. It follows that a typical adsorption time for the PSA process is in the order of minutes and the adsorber size needs to be large enough to handle the feed gas for that duration. Furthermore, the adsorbent particle sizes used in commercial adsorbers are typically between 1.5-3 mm diameter, so that the pressure drop in the adsorber is small. This can increase the diffusional mass transfer resistance for adsorbing components of feed gas mixture into the adsorbent particle and create a mass transfer zone (MTZ) of significant size. Since the separation efficiency in the MTZ is much reduced, the adsorbers are made of certain size so that the ratio of MTZ length to the adsorber length is small. Typically, the commercial adsorbers are 5-30 feet in length. The net result is a markedly increased and costly adsorbent inventory in situ for a given separation duty. Approaches that can reduce capital cost (adsorber vessels, piping, switch valves and related plumbing) and that can reduce adsorbent inventories are quite in order.

One method to achieve this goal is to use a rapid pressure swing adsorption (RPSA) process as described by U.S. Pat. No. 4,194,892, operating with a single adsorber and much reduced gas pipe lines and switch valves and a very fast cycle time of seconds. This process uses a three step cycle consisting of introducing the compressed feed gas into the adsorber at the feed end, for a very short period of time (seconds or fraction of seconds), then suspending feed introduction for a period of less than 10 times the feed introduction period and then countercurrently depressurizing the column to near ambient pressure in a time period which is at least twice as long as the feed introduction period. The feed introduction is suspended during the last two steps and it is reintroduced after the depressurization step in order to start a new cycle. A continuous product gas enriched in the less strongly adsorbing component of the feed gas mixture is withdrawn through the product end of the column during the entire cycle.

Although this process reduces adsorbent inventory by using a very short cycle time, it has several key deficiencies:

(a) The feed introduction is discontinuous which is an impediment for a commercial process, in particular, if a compressor is used to compress the feed gas;

(b) The desorption step (depressurization) is discontinuous. Thus, if the desorbed gases constitutes the main product then its flow is disruptive;

(c) The desorption of the absorbed components of the feed mixture is caused by pressure reduction and by back purging (countercurrent) by flow of a portion of the less strongly adsorbed component of the feed mixture which is separated and collected in the column towards the product end during the first two steps of the process. In order to supply a sufficient quantity of back purge gas, only a very small section of the column is used to hold the more strongly adsorbed component of the feed gas and the remaining column is used to hold the less strongly adsorbed component, thus, not utilizing the entire separator capacity of the column;

(d) The design of the column requires a critical relationship between its length, individual cycle times for the steps, pressure ratio between feed and desorption steps which can very much complicate the operation of the process due to fluctuations in feed gas composition, pressure and, or temperature which are common in industrial practice. This critical relationship between the operating variables is established by the requirement described in (c) above.

Another example of a RPSA process is described in U.S. Pat. No. 4,194,891 which is designed to produce an oxygen-enriched product gas from air by adsorption of nitrogen on a 5 Angstrom zeolite. It employs two or three adsorption columns arranged in parallel flow connection which undergo the sequential steps of adsorption, feed suspension, countercurrent desorption and purging, and one or two countercurrent pressurization steps with oxygen enriched product gas. A feed introduction time of 0.1 to 6.0 seconds is used. This process, therefore, appears to use the conventional design of a multicolumn, multi-step PSA system, except that the cycling is done fairly rapidly. Significant scale-up of this process may be questionable due to the reasons discussed earlier.

The present invention discloses a novel RPSA cycle and hardware arrangement which can overcome some of the shortcomings described above.

The new RPSA process provides continuous introduction of feed gas into the adsorber, continuous withdrawal of a stream enriched in the less strongly adsorbed component of the feed mixture, continuous withdrawal of a stream enriched in the more strongly adsorbed component of the feed mixture, very efficient use of the adsorbent capacity and yet significantly reduces the adsorbent inventory and the requirements for gas lines, adsorber vessels and switch valves.

These and other aspects and features of the invention will become apparent to one skilled in the art from the specification, claims and drawing appended hereto.

BRIEF SUMMARY OF THE INVENTION

The present invention provides an effective process for the production of either oxygen or nitrogen from a feed stream, such as air, or for drying a gas stream, or for the isolation of a desired stream component, like hydrogen, from a steam reformer stream containing hydrogen and impurities like $CO_2$, CO, $CH_4$, and nitrogen. In general, the invention can be used to separate any binary gas mixture comprising a more adsorbable component (A) and a less strongly adsorbed component (B) or to separate a multicomponent gas mixture containing the components A and B among others. The chief premise of the invention is to permit moderately fast cycling of the adsorption and desorption steps of the PSA process in a shallow adsorbent layer loaded with very small adsorbent particles. A shallow adsorbent layer is defined by the requirement that the ratio of the diameter (D) of the layer to its height (L) be greater than one ($D/L > 1$). A preferred $D/L$ ratio for the operation of the present invention is $D/L > 1.5$. A more preferred ratio is $D/L > 3.0$. This is opposite to the $D/L$ ratio preferred in a conventional PSA process where $D/L$ is $> 1$, and preferably a $D/L > 0.3$ is practiced.

A continuous feed and two continuous product streams, one enriched in the more strongly adsorbed component of a feed mixture and the other enriched in the less strongly adsorbed component of the feed mixture can be had by rigging at least dual shallow layers, spaced apart in a single adsorber vessel. In one embodiment, they sandwich a perforated plate which serves to effect a major pressure drop in gas pressure when gas flows from one shallow layer to the other. A fraction of effluent gas from a layer, which is used for purging the other layer, is controlled chiefly by the pressure drop across the adsorbent layers. The other key features of the present process are simultaneous occurrence of pressurization and adsorption steps and simultaneous occurrence of depressurization and purge steps in the layers while providing continuous introduction of feed gas and continuous withdrawal of two effluent streams from the system and yet provide very efficient utilization of the layers adsorption capacities. This invention eliminates the need for dual or multiple adsorption columns of large dimensions, many gas headers and switch valves.

DETAILED DESCRIPTION OF THE INVENTION

The present invention provides for an effective process and apparatus for separating a selective component from a gas stream containing two or more components by the use of a RPSA concept, but which has been modified for relatively fast cycling and by employing novel and simplified hardware needs for efficient operation.

Figure 1:
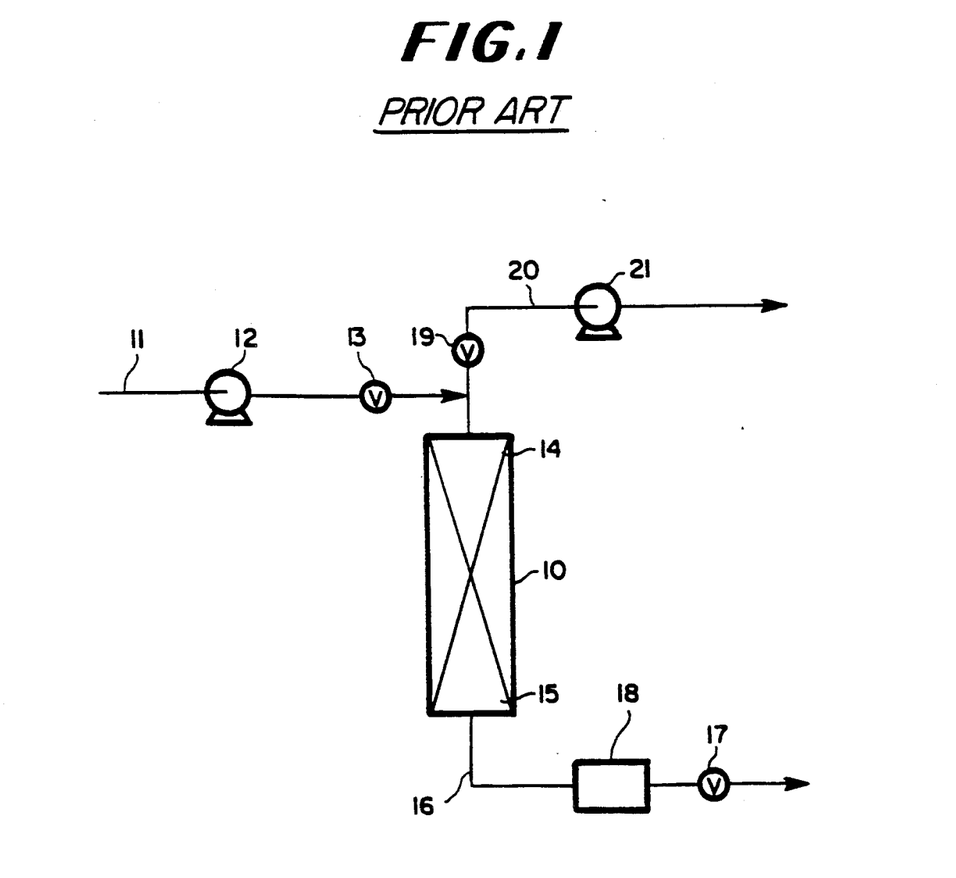
FIG. 1 is a schematic drawing of a state-of-the-art apparatus suited for rapid adiabatic pressure swing process separation of a multi-component feed gas. [See FIG. 1 of U.S. Pat. No. 4,194,892 to Union Carbide]

According to the prior art RPSA process depicted by FIG. 1, a feed gas of at least two components is introduced through conduit 11, having compressor 12, sometimes followed by a feed surge tank (not shown), before passing through flow control valve 13 into one end 14 of the adsorbent column 10. At least one component is selectively adsorbed, and a gas stream enriched in the other components of the feed gas exits through column end 15, flowing into conduit 16 having flow control valve 17. If needed, a product gas surge tank (18) is installed in conduit 16.

Following the feed gas introduction period, feed valve 13 is closed and exhaust valve 19 in conduit 20 joining the inlet end is opened. It may be desired to provide pump 21 in exhaust conduit 20 to accelerate the reverse outward flow of one component—depleted purging—one component desorbate gas.

Generally, according to the present invention, a compressed feed gas at high pressure which is composed of a more selectively adsorbed component A, and a less selectively adsorbed component B is fed directly and continuously to one adsorbent layers of the system for selective adsorption of component A over component B.

A portion of the now component B-rich process stream upon exiting the layer, is withdrawn through an effluent manifold, being still at a relatively high pressure. This effluent may constitute one of the products from the process. The balance of such process gas can be passed through a pressure drop zone, then, through the second adsorbent layer, but in a countercurrent direction to the feed gas flow to that layer. This serves to desorb (purge) the adsorbed component A from that A-saturated second layer, which extracts component A. The gas enriched in component A is then exhausted through the waste gas manifold. This waste effluent may constitute one of the products from the process.

While the second layer is being purged with the component B-rich gas obtained from the first layer, the pressure of the second layer is simultaneously reduced from the highest adsorption pressure to the lowest desorption pressure of the cycle, causing desorption of component A from the layer by simultaneous pressure reduction as well as the earlier described purging.

After a layer is sufficiently cleared of component A, feed gas is introduced into it for simultaneous pressurization and adsorption of component A to produce a B rich effluent gas, partly to be withdrawn as product and partly to be used a purge gas for the other layer as described before, thus during this step the pressure of the adsorbent layer rises from the lowest pressure level in the cycle to the highest pressure level, while simultaneously producing a B rich stream.

Figure 2:
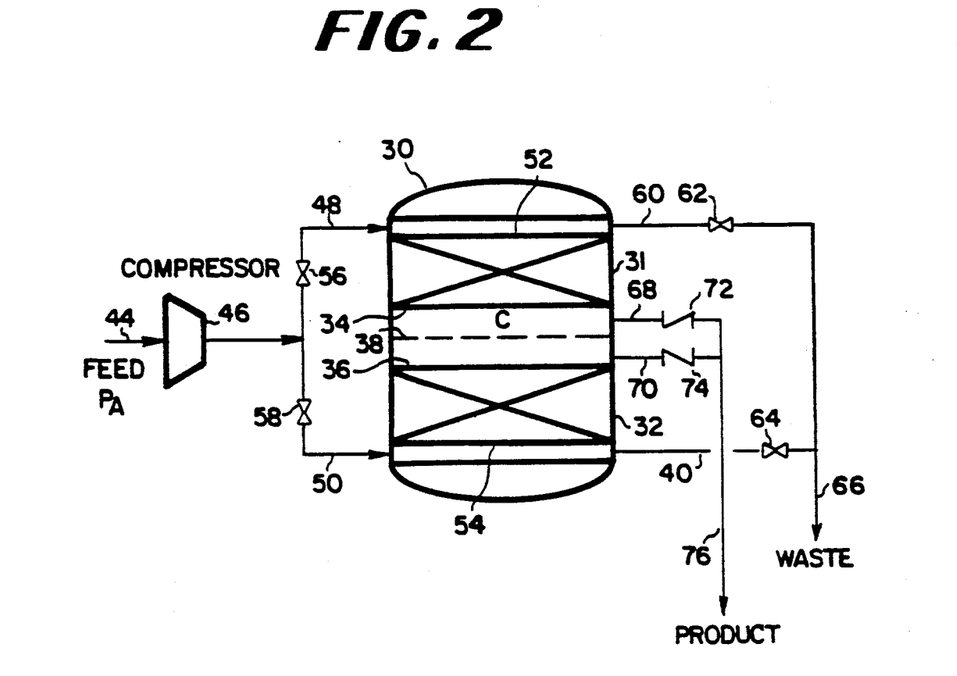
FIG. 2 is a schematic drawing of one particular embodiment of apparatus suited for carrying out the rapid pressure swing absorption (RPSA) process of the present invention.
Figure 3:
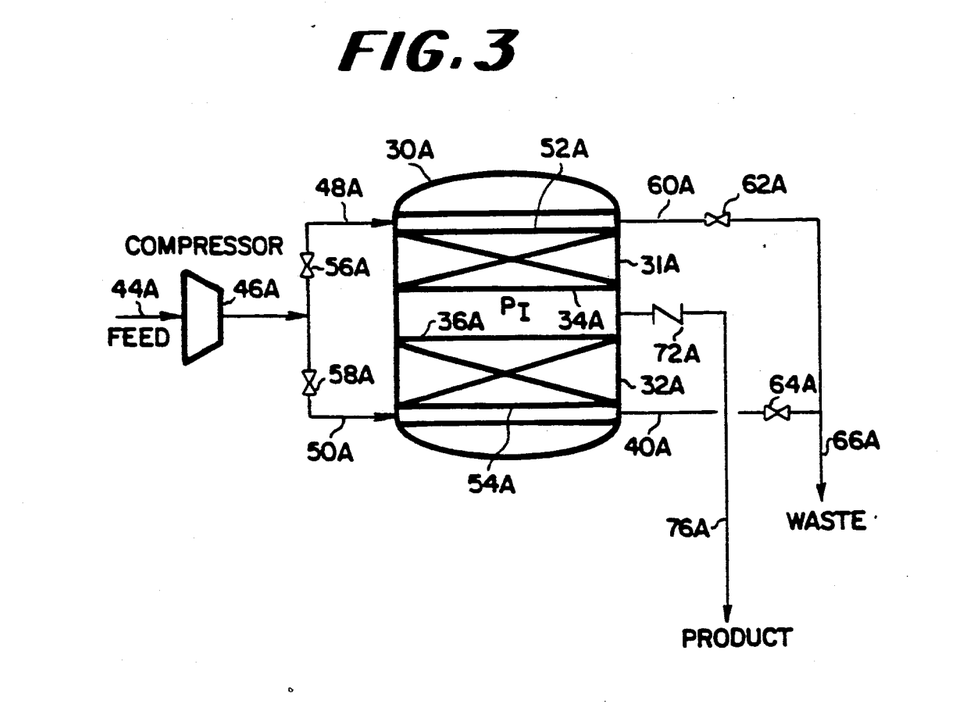
FIG. 3 is a schematic drawing of another embodiment for an RPSA apparatus and process of the present invention.
Figure 4:
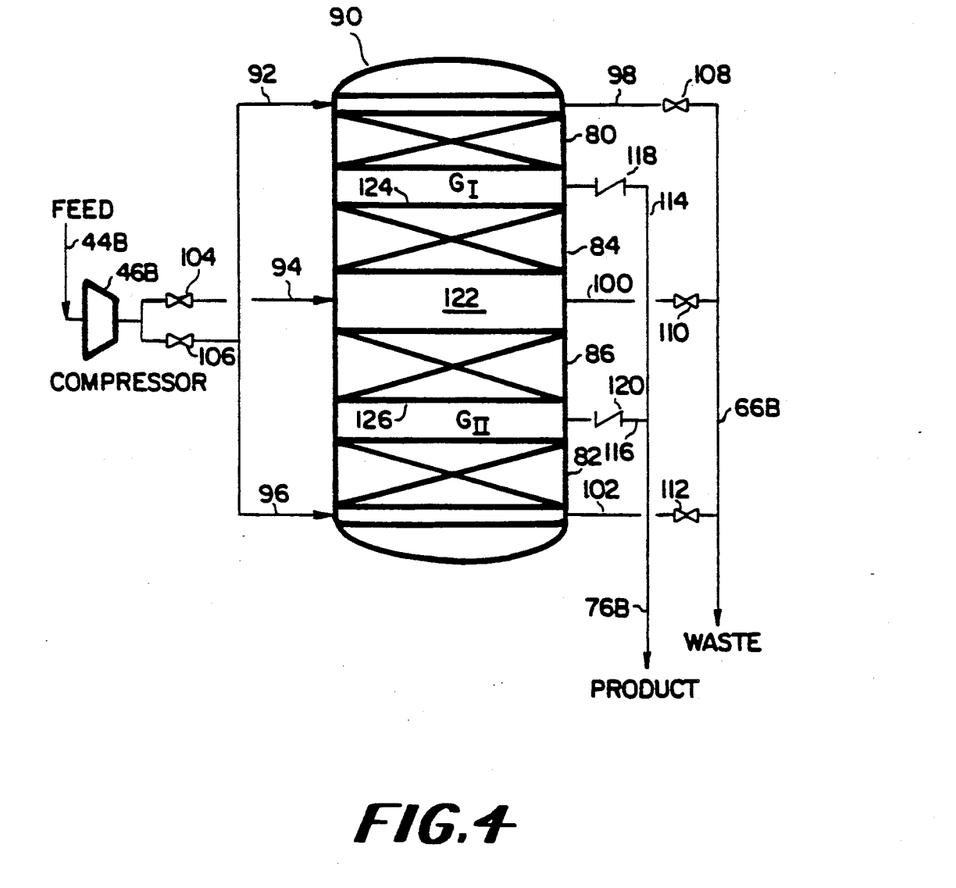
FIG. 4 is a schematic drawing of a third embodiment of the RPSA apparatus and process of the present invention.

The present invention process, as depicted in FIGS. 2 to 4 shows a single mixed component (compressed) feed gas stream entering the system (split feed points), with a single product stream and a single waste gas stream emerging, permitting essentially continuous flow of feed gas into and product gas out from the separation process.

A first embodiment of this process is depicted in FIG. 2. It consists of a single adsorption chamber 30 encasing horizontally-disposed adsorbent layers, 31, 32 composed of selected adsorbents. These layers range from 6 to 48 inches in depth, and support an adsorbent material ranging between 0.2 and 1.0 mm average diameter (60 and 20 mesh) particle size. The two stacked layers are spaced apart a vertical distance ranging between 0.1 and 1.0 feet.

A representative adsorbent layer (31) has a vertical length between 0.5 and 4.0 feet, while the diameter of each adsorbent layer is between 0.5 and 20 feet. This, in turn, defines the inner diameter of closed vessel 30, in which it is securely mounted, with an essentially hermetic seal between bed 31 periphery and vessel curvilinear side walls.

Interposed between layers 31 and 32 in Zone C is a physical flow constriction means for effecting a significant pressure drop between the lower surface 34 of upper layer 31 and the upper surface 36 of lower layer 32. Preferably, this means comprises a rigid but gas-porous planar structure, such as a perforated metallic plate 38. Plate 38 is up to 240 inches in diameter, and is provided with a regular array of transverse linear perforations (not shown). These are adapted to cause a substantial gas pressure drop, the extent of which is a function of the process stream exiting upper layer 31 or lower layer 32, and should range between 10 and 90 percent of feed gas entry pressure. Alternatively to a formed perforated plate 38, a planar screen or a porous ceramic or sintered metal divider may be employed, conveniently having a disc-like configuration to conform snugly with the vessel.

Feed gas enters the system via conduit 44, having turbo-compressor 46 disposed therein (optional). The compressed feed gas flows alternately via conduits 48 and 50 to the external surface 52 of upper layer 31, or to the external surface 54 of lower layer 32. This intermittent flow is controlled by the operation of line valves 56 and 58, disposed in conduits 48 and 50, respectively.

On the opposing outer perimeters of layers 31 and 32 found are operatively-connected waste stream conduits 60 and 40, having flow control valves 62 and 64, respectively, disposed in them. Exhaust valves 62 and 64 are opened alternately, when either of the spaced apart layers 31/32 are being simultaneously depressurized and purged to remove the adsorbed component A from the system via common waste gas manifold main 66.

A pair of effluent conduits 68 and 70 are operatively connected to the open space on opposing planar surfaces of perforated plate 38 to permit outflow of the component B-rich product stream. These conduits include one-way check valves 72 and 74 to provide product outflow only to common product main 76.

A separate recycle conduit (not shown) can be operatively connected to product manifold 76 to recycle a portion of the product stream to purge either of layers 31 or 32, as needed. This layered adsorbent system is characterized by small adsorbent particle size in the layers, to foster fast kinetics, shallow layer depth and a bimodal distribution of adsorbent particles (optional), resulting in less voids in the adsorbent layers themselves.

The choices of suitable adsorbent materials and appropriate particle sizes are set forth in Table 1.

TABLE 1

| Adsorbent Specifications |
|---|
| Suitable Adsorbent Materials: |
| Single or binary ion-exchanged (with metals of Periodic Table Group I and II) zeolites of types A, X, Y; mordenite or chabazite |
| Activated carbons |
| Silica and alumina gels |
| Adsorbent Particle Sizes: |
| 0.2-1.0 mm diameter (mean) in granular, spherical or extruded form, for single mode distribution. |
| Above particles are mixed with 0.05-0.20 mm diameter (mean) particles for bimodal distribution. |
| For bimodal distribution, 75-90% of the adsorbent particles in the adsorbers are the larger sized particles - the balance consist of the smaller particles. |

In a preferred operating mode of the process embodiment shown by FIG. 2, compressed feed gas composed of a more selectively adsorbed component A and a less selectively adsorbed component B is fed first to adsorbent layer 31 through valve 56 and line 48 while keeping outflow valve 62 closed. The pressure of layer 31 is raised from the lowest pressure of the cycle to the highest pressure, while simultaneously, component A is adsorbed in layer 31 and a stream enriched in component B is produced at its inner surface 34. A portion of this gas is withdrawn through valve 72 and lines 68/76 as product. The other component B-enriched gas portion is passed through screen 38 to reduce its pressure, and then passed through lower layer 32, which is simultaneously depressurized from the highest pressure level in the cycle to the lowest pressure. The depressurized and purge effluent gas (A-rich) is removed from layer 32 through open valve 64 into lines 40/66 to form waste gas. Feed inflow valve 58 is closed during this time.

The introduction of feed gas to layer 31 is continued until its effective adsorption capacity for component A is preferably fully exhausted, thus completely or nearly completely utilizing its capacity, and hence increasing the separation efficiency of the process. Thereafter, valves 56 and 64 are closed and valves 58 and 62 are opened so that feed is switched to layer 32 for its simultaneous pressurization and adsorption and for simultaneous depressurization and purging of spent layer 31. This permits continuous flow of feed and two product gases from the system of the present invention. Table 2 shows the valve operation schedule for this embodiment.

TABLE 2

| | Operation of Adsorbent Sections (FIGS. 2 & 3) | |
|---|---|---|
| Time | Upper Adsorbent Layer (31 or 31A) | Lower Adsorbent Layer (32 or 32A) |
| 0-$t_A$ | Pressurization/ Adsorption stage | Depressurization/ Purge stage |
| $t_A$-$t_D$ | Depressurization/ Purge stage | Pressurization/ Adsorption |

| Valve Operation Schedule (FIGS. 2 & 3) | | | |
|---|---|---|---|
| | (Inflow) Switch Valves (Outflow) | | |
| Time | 56 (or 56A) | 58 (or 58A) | 62 (or 62A) | 64 (or 64A) |

TABLE 2-continued

| | | | | |
|---|---|---|---|---|
| O-'A | O | C | C | O |
| 'A-'D | C | O | O | C |

'A = 3-30 seconds
'D-'A = 3-30 seconds
O = Open
C = Close

A key feature of this invention is that the total cycle time used is only moderately rapid (6-60 seconds), so that the durations of both the simultaneous pressurization-adsorption step and the simultaneous depressurization-purge step are half of the total cycle time (3-30 seconds) as opposed to very fast adsorption time of a second or a fraction disclosed in U.S. Pat. No. 4,194,892 and the complicated relationship between the times of different steps of that process. This relatively longer adsorption time allows the adsorbing components of the feed gas (for example component A) to fully diffuse into the entire mass of the adsorbent particle, thus utilizing its full adsorption capacity. A very short adsorption time, such as a second or less, prevents full utilization of the particle adsorption capacity and thus reduces the efficiency of separation.

An alternate configuration for a dual layer, single adsorption column separation system is shown in FIG. 3. Corresponding parts have the same part number and same function as with FIG. 2 but part numbers are altered with the suffix "A". Column 30A is externally configured, piped and valved, much like the apparatus of FIG. 2. The only external piping change is in the employing of only a single and essentially centered product effluent conduit 76A (with check valve 72A) for product gas recovery from the system via conduit 76A. Internally, the use of a perforated plate (38 of FIG. 2) effecting the internal pressure drop is omitted. In this embodiment, the particle size range and the bed height are further tailored so that there will be a compensating substantial pressure drop across both layers. Typically, the adsorbent particle sizes in the layers range from 60 to 20 mesh. Pressure drop across the adsorbent layer undergoing adsorption can range from 200 to 3 psig, and across the adsorbent layer undergoing desorption can range from 30 to 0 psig. The main column and flow valve actuation schedules for the embodiments of FIG. 3 are also presented in Table 2.

Consequently, the intermediate product gas pressure, $P_I$, underflowing upper layer 52A is still sufficiently compressed so that a certain fraction of this product gas flows through lower layer 54A for its regeneration stage, while the balance of product exits (product) effluent conduit 76A, having open check valve 72A, suitably set for this purpose. The waste gas produced in lower layer 54A is removed at near ambient pressure via valved 64A effluent conduit 40A to the common waste gas manifold 66A. As with the first embodiment of FIG. 2, unsteady state operation but dynamic adsorption can be achieved with the thusly modified RPSA of the present invention.

It is necessary to monitor when the purity of Component-B rich product stream is compromised by the concurrent purging of the spent layer with a proportion of the same component B-rich produced stream. This is accomplished by providing product stream composition monitors (not seen) in each of product conduits 68, 70, 76 (FIG. 2); 76A (FIG. 3) and 114, 116, and 76B in FIG. 4. Upon the component B-rich product gas stream in the flowing product conduit declining in purity to a preset upper permissible level of the undesired component A, then the flow control valves are actuated to reverse the split feed gas flow directions, so that the alternate adsorbent layers (or pair in FIG. 4) is now used to produce the component B-rich product. Concurrently, the spent layer is regenerated by purging with a portion of the component B-rich gas. This stage continues until the preset upper level of undesired component A is reached in the alternate product conduit, and the pathways are again reversed.

The above described flow reversals can also be achieved by monitoring pressures at different parts of the system and switching valves when a preset pressure level is reached.

In FIG. 4 is shown a double-stack variation of the no-pressure drop plate system of FIG. 3, which will appreciably increase the production capacity of a single column gas separation system. There are four stacked layers 80, 82, 84, and 86, all being disposed operatively (spaced-apart) within the column 90, and each being centered on the approximate vertical center line thereof. The depicted piping and valving array are adapted to operate outer layers 80 and 82 simultaneously in the component separation (pressurization-adsorption) stage, while inner layers 84 and 86 are in the regeneration (depressurization-purging) stage; alternately, while outer layers 80 and 82 are in the regeneration stage, then inner layers 84 and 86 are in the component separation stage, this being effected by valving procedures to be described.

This embodiment entails three feed gas conduits 92, 94, and 96, and three waste gas conduits 98, 100, and 102, the latter set being arrayed on the diametrically opposing sidewall of column 90. The main feed line conduits 92 and 96 have flow control valve 106 and the other main feed line 94 has control valve 104 respectively, disposed therein. Similarly, the waste gas conduits 98, 100, and 102 have control valves 108, 110, and 112 respectively located therein. Product conduits 114 and 116 have one-way flow, check valves 118 and 120, respectively. Such valves are programmed to permit alternating operation of the paired layers between component separation and layer regeneration phases. The main column and flow actuation schedules for the embodiment (FIG. 4) are presented in Table 3. Corresponding parts of FIG. 4 to the parts of FIG. 2 have corresponding functions and the parts numbers are followed by the suffix "B".

TABLE 3

| Operation of Adsorbent Sections (FIG. 4) | | |
|---|---|---|
| Time | Sections 84, 86 | Sections 80, 82 |
| O-'A | Pressurization/Adsorption Stage | Depressurization/Purge Stage |
| 'A-'D | Depressurization/Purge Stage | Pressurization/Adsorption stage |

| Valve Operation Schedule (FIG. 4) | | | | | |
|---|---|---|---|---|---|
| | Switch Valves | | | | |
| Time | 104 | 106 | 108 | 110 | 112 |
| O-'A | O | C | O | C | O |
| 'A-'D | C | O | C | O | C |

'A = 3-30 seconds
'D-'A = 3-30 seconds
O = Open
C = Close

In a first operating mode, compressed feed gas is introduced via conduit 44B and turbo compressor 46B (optional) into the middle space 122 operating located between the inner layers 84, 86 to activate both opposing inner layers into the adsorption stage. A part of the resulting process gas, $G_I$ and $G_{II}$ from the outward surfaces 124 and 126 of inner layers 84 and 86, serve to regenerate the component saturated outer layers 80 and 82. The balance of the product gas is withdrawn through one-way, flow check valves 118 and 120 in product conduits 114 and 116. The adsorbent serves for selective adsorption of component A over component B. When the product gas purity in product manifold 76B, as measured by the permissible level of reject component A in it, reaches its preset maximum level, the feed flow direction is switched concurrently to conduits 92 and 96.

Concurrently, a fraction of the component B-rich, process gas, now flowing inwardly through outer layers 80 and 82, is used to regenerate inner layers 84 and 86, while the balance of the product gas exits the column 90 via check valve conduits 114, 116 and 76B. The desorbed component A also flows from inner layers 84 and 86 to central chamber 122, and is withdrawn via central waste gas conduit 100 to waste gas manifold 66B.

The switching frequency, or cycling, is quite rapid in the present invention and is a function of adsorbent particle size, adsorbent bed depths and feed gas entry pressure, thus usefully employing fast kinetics and truly dynamic component adsorption. The embodiment of FIG. 4 can also be operated with perforated plates located between alternate layers, as described with reference to FIG. 2.

In another embodiment, when the feed gas to the separation system of the present invention is known to contain a particular impurity, like water, then a layer selected from one of accepted desiccant materials (alumina, silica gels, zeolite molecular sieves, or hydrophilic forms of activated carbon) is usefully employed. The particulate desiccant is packed adjacent to the feed end of the adsorbent layer systems, followed by a layer of the separation adsorbent adapted to the particular gas feed make-up. This is employed in each adsorbent layer, with appropriate orientation of the bimodal layer materials to effect feed gas desiccation first. The length/depth of the desiccant layer ranges from 20 to 50% of the total length of the adsorbent layer.

The operating conditions of the present invention are further illustrated by the following examples.

EXAMPLE I

Air Separation

The compressed air feed enters the vessel at between 20 and 100 psig. The main adsorbent is a nitrogen-selective zeolite material of Table 1, which produces an oxygen-enriched product stream. Alternatively, the layers are loaded with an oxygen- selective material, such as fluomine, salcomine, or the like, which produces a nitrogen-enriched product stream. Feed temperature ranges between 40° and 120° Fahrenheit. Feed gas flow rate will be between 1.0 and 30.0 lbs. moles per hour per cross- sectional area (Ft. 2) of the adsorbent layer.

When the adsorbent used is selective for $N_2$ over $O_2$, the adsorption step is stopped when the $O_2$ concentration of the effluent gas leaving the adsorbent layer reaches a preset limit. This limit can be 80–90% $O_2$ when a high $O_2$ concentration product is desired. The limit can be 22–35% $O_2$ when a low $O_2$ concentration product is desired.

When the adsorbent used is selective for $O_2$ over $N_2$, the adsorption step is stopped when the $N_2$ concentration of the effluent gas leaving the adsorbent layer reaches a preset limit. This limit can be 95–99.5% $N_2$ when a high $N_2$ concentration product is desired.

EXAMPLE II

A humidified process gas is fed at a pressure between 30 and 120 psig and in a temperature range between 40° and 120° Fahrenheit to the gas separation vessel. The major adsorbent in the opposing layers is a water-selective material, such as zeolite molecular sieves, alumina or silica gel. The feed gas flow rate ranges between 1.0 and 50 lb. moles per hour per square foot of the adsorbent layer. The feed gas introduction in this case is stopped when the dew point of the effluent gas from the adsorption layer reaches a preset limit which can be between a dew point of $-20°$ to $-80°$ C.

EXAMPLE III

The gas is a binary mixture ($H_2$—$CH_4$, $H_2$—CO or $H_2 CO_2$) or a multicomponent mixture containing 40 to 90% $H_2$ and various concentrations (dilute or bulk) of $CO_2$, CO, $CH_4$, higher alkane hydrocarbons, $N_2$ and $H_2O$. The feed is at a pressure of 30–300 psig and temperature of 50°–120° Fahrenheit. The main adsorbent can be a zeolite molecular sieve or an activated carbon. The mixed feed flow rate is between 1.0 and 100 lb. moles per square foot of layer an hour. The feed gas introduction in this case is stopped when the $H_2$ concentration of the effluent gas exiting the adsorbent layer reaches a preset limit between 95–99.99% $H_2$.

The present invention has been described with reference to some specific embodiments thereof. These embodiments should not be considered as a limitation on the scope of the present invention. The scope of the present invention is ascertained by the following claims.

I claim:

1. In a rapid adiabatic pressure swing adsorption process for the separation of a multi-component feed gas by selectively adsorbing at least one component in a single adsorbent vessel by introducing a compressed feed gas alternatively into opposing portions of the vessel, the improvement comprising the steps of:
    (a) providing one or more adsorption zone(s) comprising dual, spaced apart, relatively shallow depth first and second adsorption layers, with each adsorbent layer comprised of relatively small size range of particles, such particles being adapted to more selectively adsorb a first component A than a second component B, both contained in said feed gas;
    (b) passing at least a first portion of feed gas continuously through one or more of said first layer(s) of the adsorbent and withdrawing a first portion of a component B-rich gas stream from said first layer(s) as comparatively high pressure stream(s) to a product conduit;
    (c) concurrently passing a second portion of said component-B gas stream(s) after an induced pressure drop through said one or more second layer(s) of adsorbent countercurrent to feed gas flow through that layer to purge retained component A therefrom and to withdraw component A gas to one or more first waste gas conduit(s);
    (d) upon the component B-rich product gas stream purity in said product conduit declining to a preset maximum permissible level for the component A content, switching the compressed feed gas flow to the one or more second layer(s) of adsorbent to withdraw a first portion of component B-rich gas stream(s) to a product conduit while said one or more first layers are purged with the one or more second portion(s) of the component B-rich gas stream produced from said one or more second adsorbent layer(s); and (e) upon the component B-rich gas stream purity in said product conduit declining to a preset maximum permissible level for the component A content, again reversing the compressed feed gas flow to the mode of step (b).

2. The process of claim 1 wherein during step (b) the pressure of the first adsorption layer is increased from a lowest desorption pressure to a highest adsorption pressure by introduction of the feed gas, and then step (b) is continued while withdrawing the component B-rich effluent product gas from the first adsorption layer thus causing simultaneous pressurization and adsorption in that zone.

3. The process of claim 1 wherein during step (c) the pressure of the one or more second layer(s) is decreased from a highest adsorption pressure to a lowest desorption pressure by withdrawal of gas from the one or more second layer(s) while the purge step is conducted with component B-rich gas, thus causing simultaneous depressurization and purging in the one or more second layer(s).

4. The process of claim 1 wherein said second portion of B-rich gas initially passes through a flow constriction means adapted to drop its pressure appreciably before passing same through said second adsorbent layer in a countercurrent flow direction to desorb the adsorbed component A from said layer, and withdrawing of same to said one or more waste gas conduit(s).

5. The process of claim 1 wherein the adsorbent particle size in both of said layers ranges between 0.2 and 1.0 millimeters diameter (60–20 mesh), adsorbent layer depths range between 6 and 48 inches, the rapid adiabatic pressure swing adsorption process steps of (b) through (e) are of six to sixty seconds and feed gas flow rates range from 1 to 100 lb. moles/hr/$FT^2$.

6. The process of claim 1 wherein the feed gas has entrained moisture as component A and each adsorbent layer comprises a water-selective adsorbent selected from one of (aluminum, silica gel, or zeolite) at the feed end.

7. The process of claim 1 wherein the feed gas is air and the one or more adsorbent zone(s) are adapted to producing an oxygen-enriched product stream upon employing a nitrogen-selective adsorbent.

8. The process of claim 1 wherein the feed gas is air and the one or more adsorbent zone(s) are adapted to producing a nitrogen-enriched product stream upon employing an oxygen-selective adsorbent.

9. The process of claim 1 wherein the feed gas is a hydrogen containing gas mixture and the one or more adsorbent zone(s) are adapted to producing a hydrogen-enriched product stream upon employing an adsorbent selective for non-hydrogen components.

10. The process of claim 1 in which hydrogen and methane comprise the feed gas at 20 to 300 psig, activated carbon or zeolite between 60 and 20 mesh particle size comprises said adsorbent which is arrayed in a layer length of 6 to 48 inches, and said rapid adiabatic pressure swing adsorption process of steps (b) through (e) ranges from six to sixty seconds.

11. The process of claim 1 in which hydrogen and carbon monoxide comprise the feed gas at 20 to 300 psig, activated carbon, zeolite, or a CO complexing material between 60 and 20 mesh particle size comprises said adsorbent arrayed in a layer length of 6 to 48 inches and said rapid adiabatic pressure swing adsorption process of steps (b) through (e) ranges from six to sixty seconds.

12. The process of claim 1 in which the feed gas is a mixture of hydrogen as the desired product, while carbon monoxide methane, nitrogen and carbon dioxide are the balance, said feed gas is at 20 to 300 psig, the adsorbent is a homogenous mixture of activated carbon and zeolite molecular sieves of at least 4 angstroms, and an apparent particle between 60 and 20 mesh particle size, and a layer of 6 to 48 inches and said rapid adiabatic pressure swing adsorption process of steps (b) through (e) ranges from six to sixty seconds.

13. The process of claim 1 wherein the feed gas pressure drop between the first and second adsorption layers is induced by a fixed member disposed therebetween which is permeable to gas flow therethrough.

14. The process of claim 1 wherein the feed gas contains moisture and each adsorption layer is modified to include a discrete layer of desiccant material adapted to remove all moisture from the feed gas being treated.

15. The process of claim 14 where the desiccant material is composed of one of alumina, silica gels, zeolite molecular sieves, and hydrophilic forms of activated carbon.

16. In a rapid adiabatic pressure swing adsorption process for the separation of a multi-component feed gas by selectively adsorbing at least one component in a single adsorbent vessel by introducing a compressed feed gas alternately into opposing ends of the vessel, the improvement comprising the steps of:

(a) providing an adsorption zone comprising of dual, spaced apart, relatively shallow depth first and second adsorption layers, with each adsorbent layer comprised of relatively small size range of particles, such particles being adapted to more selectively adsorb a first component A than a second component B, both contained in said feed gas;

(b) passing the feed gas continuously through the first layer of the adsorbent and withdrawing a portion of a component B-rich gas stream from in said first layer as a comparatively high pressure stream to a first product conduit;

(c) concurrently passing a second portion of said component-B gas stream after an induced pressure drop through the second layer of adsorbent countercurrent to feed gas flow through that layer to purge retained component A therefrom and to withdraw component A gas to a first waste gas conduit;

(d) upon the component B-rich product gas stream purity in the first product conduit declining to a preset maximum permissible level for the component A content, switching the compressed feed gas flow to the second layer of adsorbent to withdraw a first portion of component B-rich gas stream to a second product conduit while the first layer is purged with the other portion of the component B-rich gas stream produced from the second adsorbent layer; and (e) upon the component B-rich gas stream purity in said second product conduit declining to a preset maximum permissible level for the component A content, again reversing the compressed feed gas flow to the mode of step (b).

17. In a rapid adiabatic pressure swing process for the separation of a multi-component feed gas by selectively adsorbing at least one component in a single adsorbent vessel by introducing a feed gas into opposing portions of the vessel, the improvement comprising:
  (a) providing dual adsorption zones each comprising paired, spaced apart, relatively shallow depth first and second adsorption layers, with each of the layers comprising relatively, small size range particles, such particles being adapted to more selectively adsorbed a first component A than a second component B contained in said feed gas;
  (b) passing a first portion of feed gas continuously through the first adsorption layer of each zone and withdrawing a portion of the component B-rich gas streams unadsorbed by said first layers as a comparatively high pressure stream recovered from a central first product conduit;
  (c) concurrently passing a second portion of said component B-rich gas streams through the second adsorbent layer of each zone in a countercurrent flow direction to purge retained component A therefrom and to withdraw component A to a first waste gas conduit; and
  (d) upon the component B-rich gas stream purity in the first product conduit declining to a preset maximum permissible level for component A content, switching the compressed feed gas flow to the second adsorbent layer of each zone to withdraw the component B-rich gas stream to said product conduit, while the first adsorption layers are purged with the other portion of the B rich gas from said second adsorption layers of each zone.

18. A gaseous component separation apparatus in which the separation is conducted in a single, elongated sealed vessel under rapid adiabatic pressure swing adsorption process conditions, involving selectively adsorbing at least one component from a portion of a feed gas stream on an adsorbent material and concurrently using a portion of a resulting product gas stream to desorb said one component, preferentially retained in the adsorbent material comprising:
  (a) two contiguous layers of porous adsorbent material spaced apart in said vessel, each of which are adapted to each more selectively adsorb a first component A than a second component B from said feed stream;
  (b) two discrete compressed feed gas conduits functionally connected and spaced apart along the elongate dimension of said vessel for selectively introducing high pressure, feed gas into same;
  (c) two discrete waste gas conduits functionally connected and spaced apart along the elongate dimension of said vessel and diametrically aligned from the feed gas conduits, and also proximal the longitudinal end of said vessel, for selectively withdrawing a waste gas stream which is rich in the first component A of said feed gas stream;
  (d) two discrete product gas conduits functionally connected and spaced apart intermediate the opposing longitudinal ends of said vessel for withdrawal of a component B-rich product gas stream from an intermediate zone of the separation vessel;
  (e) a first and second valving means disposed in each one of said gas feed conduits, respectively, adapted to permit an interruptable flow of said feed gas to the outer surface of said adsorbent layers;
  (f) third and fourth valving means disposed in each of said product gas conduits, respectively, adapted to permit interruptable, component B-rich product gas withdrawal from the inner surfaces of said adsorbent layers within the vessel, until said adsorbent layers are spent and ready for regeneration;
  (g) a fifth and sixth valving means disposed in each of the two waste gas conduits, respectively, adapted to permit interruptable flow of said component A-rich waste gas from the outer surfaces of said adsorbent layers until said layers are regenerated and ready for the selective gas adsorbent stage; and
  (h) a physical barrier means interposed between said layers permitting flow communication therebetween and effecting an appreciable gas pressure drop across the intermediate zone of the vessel.

19. The apparatus of claim 18 wherein the pressure drop effecting means comprises a perforated metallic plate.

20. The apparatus of claim 18 wherein the pressure drop effecting means comprises a porous ceramic plate.

21. The apparatus of claim 18 wherein the pressure drop effecting means comprises a porous sintered metal plate.

22. A gaseous component separation apparatus in which the separation is conducted in a single, elongated sealed vessel under rapid adiabatic pressure swing adsorption process conditions, involving selectively adsorbing at least one component from a portion of the feed gas stream on an adsorbent material and concurrently using a portion of a resulting product gas stream to desorb said one component, preferentially retained in the adsorbent material comprising:
  (a) four integral layers of porous adsorbent material spaced apart in said vessel, which are adapted to each more selectively adsorb a first component A than a second component B from said feed stream;
  (b) three discrete compressed feed gas conduits functionally connected and spaced apart along the elongate dimension of said vessel for selectively introducing high pressure feed gas into same;
  (c) three discrete waste gas conduits functionally connected and spaced apart along the elongate dimension of said vessel for selectively withdrawing a waste gas stream which is rich in the first component A of said feed gas stream;
  (d) dual product gas conduits functionally connected and intermediate the opposing longitudinal ends of said vessel for withdrawal of a component B-rich product gas stream from the separation vessel;
  (e) a first valving means disposed in one of said gas feed conduits adapted to permit interruptable flow of said feed gas concurrently to the inner set of said adsorbent layers;
  (f) a second valving means disposed in the other two of said feed gas conduits adapted to permit interruptable flow of said feed gas concurrently to the outer set of said adsorbent layers while said inner layers are spent; and
  (g) third, fourth, and fifth valving means disposed in each of said product gas conduits adapted to permit product gas withdrawal from the vessel.

* * * * *